United States Patent [19]

Stevens

[11] 4,177,378
[45] Dec. 4, 1979

[54] LONG-LIVED REFERENCE CELL SIMULATING THE α SCINTILLATION OF RADON-222

[75] Inventor: William M. Stevens, Loveland, Ohio

[73] Assignee: Randam Electronics, Inc., Cincinnati, Ohio

[21] Appl. No.: 899,329

[22] Filed: Apr. 24, 1978

[51] Int. Cl.$^2$ ............................................. G01D 18/00
[52] U.S. Cl. .................................. 250/252; 250/253; 250/363 R; 250/462; 313/54
[58] Field of Search .............. 250/252, 253, 462, 363; 313/54

[56] References Cited

U.S. PATENT DOCUMENTS

| | | | |
|---|---|---|---|
| 1,275,890 | 8/1918 | Flannery et al. | 250/462 |
| 2,367,388 | 1/1945 | Davis | 250/462 |
| 2,953,684 | 9/1960 | MacHutchin et al. | 250/462 |
| 3,028,490 | 4/1962 | Guilleux | 313/54 |
| 3,030,509 | 4/1962 | Carlson | 250/462 |
| 3,176,132 | 3/1965 | Müller | 313/54 |
| 3,409,770 | 11/1968 | Clapham | 250/462 |
| 3,566,125 | 2/1971 | Linhart | 313/54 |

Primary Examiner—Harold A. Dixon
Attorney, Agent, or Firm—Eugene F. Friedman

[57] ABSTRACT

A reference cell simulating the light amplitude spectrum of an alpha scintillation cell containing radon$^{222}$. The cell includes a gas-tight container having a transparent window. The interior of the container, aside from the window, has a coating of a luminescent material. Inside of the container lies an amount of radium$^{226}$. The radium radioactively decays to produce alpha particles and radon$^{222}$. The radon$^{222}$ and its daughter particles also undergo radioactive decay to produce further alpha particles. The 1620-year half life of the radium$^{226}$ assures an adequate supply of the radon$^{222}$ for a greater time period than radon's 3.825-day half life. The production rate of the alpha particles within the container increases for a period of approximately 22 years after the cell's construction. Although the radium$^{226}$ generally has a nonuniform distribution in the cell, the produced radon assumes a gaseous form and uniformly diffuses throughout the entire cell. The decay products of the radon$^{222}$ return to the solid state and deposit uniformly on the cell's walls. The cell may allow the alpha particles from the radium$^{226}$ to contact the luminescent material and produce light. Alternately, the cell may prevent the utilization of these alpha particles by interposing a barricade between the radium and the luminescent material. Making the cell involves coating the inside of the container with luminescent material while leaving the window clear. After placing the radium$^{226}$ inside, the cell undergoes permanent sealing against the ingress or egress of gaseous components.

51 Claims, 4 Drawing Figures

LONG-LIVED REFERENCE CELL SIMULATING THE α SCINTILLATION OF RADON-222

BACKGROUND

Uranium[238], in a series of radioactive reactions, decays eventually to lead[206]. Most of these reactions produce substances which undergo further radioactive decay. Radon[222] represents one of these radioactive daughters of the decay products of uranium[238]. Specifically, radium[226], also a member of the series, yields an alpha particle to give radon[222].

Two important characteristics of radon[222] necessitate its facile and accurate detection in the environment. First, all of the uranium[238] that passes through the chain or reactions leading to lead[206] must, at some time, yield radon[222]. By way of constrast, some of the reactions in the series may proceed through alternative paths, with only a small fraction of a parent substance proceeding through one of the paths. Thus, for example, the series of reactions also produces radon[218]. However, less than 0.001 percent of the decaying uranium[238] and its daughter radionuclides provide radon[218]. Most of the material bypasses radon[218] on its path to becoming lead[206]. However, substantially all of the nuclei produced by the decay of uranium[238] must, eventually, take the form of radon[222]. Thus, the chain of radioactive decay reactions beginning with uranium[238] assures a high rate of production of radon[222].

Secondly, of the radionuclides produced in quantity by the decay of uranium[238] and its daughters, only randon[222] exists in the gaseous form; the others exist in the solid state. Since radon[222] does not remain solid, it may depart from the place of its birth to contaminate the environment about it.

Not all radon[222] produced from radium[226], however, contaminates the environment. Frequently, it cannot leave a solid substrate surrounding the particular atom of radium[226] which generated it. However, geological disturbances, such as the usual mining processes, can liberate the radioactive radon[222]. Techniques involving the use of copius amounts of water contacting with the material mined can dissolve appreciable amounts of radon[222] and produce the possibility of contaminating a water supply.

Consequently, the detection of radon[222] in the ambient atmosphere represents an important task. One method of accomplishing this involves the use of a scintillation cell which receives a sample undergoing testing for the presence of the radionuclide. Any radon[222] present will, to some extent, radioactively decay to produce alpha particles. The daughter nuclides of radon[222] can also decay to produce further alpha particles. All of these alpha particles then interact with luminescent material in the cell, causing it to scintillate and release light pulses. The light created travels through a transparent window to a detector which responds to it, such as a photomultiplier tube. A particularly advantageous example of such a scintillation cell appears in the patent application Ser. No. 805,629 of William M. Stevens, entitled "Strengthened Scintillation Cell", filed June 13, 1977.

The photomultiplier tube and the electronic equipment to which it attaches then coverts the produced pulses of light into an indication of the amount of radon[222] present. Typically, this equipment includes calibrations and adjustments that allow it to correctly interpret the light pulses and provide an accurate indication as to the amount of radon present.

With the passage of time, however, the output indications of the instrument may change and report erroneously the amount of radon present. Consequently, it should receive occasional recalibrations to make certain that the output correlates with the actual amount of radon[222] in the sample.

In particular, the instrument must respond properly to the entire amplitude spectrum of the light produced by the scintillation of the alpha particles. To verify the instrument's proper response, the detector should receive light at the wave lengths and intensities produced by radon's alpha particles. The ideal reference would, of course, utilize the alpha particles from a known concentration of radon[222] striking the same luminescent material as in the sample cell. However, radon[222] displays many characteristics that diminish its desirability as a standardizing reference source.

Initially, radon[222] has the relatively short half life of 3.825 days. Accordingly, a reference cell containing radon[222] would display substantially no activity even after the passage of as short a time as a few weeks. Consequently, a reference cell utilizing radon[222] would require replenishment at frequent intervals.

M. Blau et al., in their U.S. Pat. No. 2,510,795, show a device which removes the radon produced from radium and freezes it in a separate container. However, they then retain the radon until it decays into its radioactive daughters, in which form it may then find use for such devices as vacuum tubes. Gerhardt, in his U.S. Pat. No. 3,774,036, shows an apparatus for generating and maintaining a supply of a short-lived daughter radionuclide from a parent having a longer half life. A substantially different apparatus, but with a similar purpose, appears in U.S. Pat. No. 3,912,935 O. A. Harris.

O. Hahn, in U.S. Pat. No. 1,655,184, provides precipitate mixtures including radium salts. The produced precipitates have a fine state of subdivision and allow the radon[222] decay products to freely escape from the solid lattice. The radon may then find subsequent use for medical purposes.

Utilizing a generator for radon, such as the above, would impose a tremendous burden upon the investigator employing radon-detection equipment. He would frequently have to stop his activities to generate the radon before he could adjust his intruments.

Moreover, providing the radon does not represent a simple task. This results from the fact, discussed above, that radon exists in the gaseous form. Thus, the investigator would have to employ gas-tight equipment to generate the radon. Not only would it take appreciable amounts of his time, but he might have to return to a laboratory which could provide the proper apparatus. Furthermore, he would have to do this frequently since the produced radon, as discussed above, has a half life of less than four days.

B. A. Staples, in his U.S. Pat. No. 3,859,179, provides a method of preparing a calibration source for film badges sensitive to beta particles. Specifically, he electroplates a stainless steel disc with nickel and a carrier including radioactive rhuthenium[106]. This radionuclide decays with a half life of one year to rhodium[106]. The latter isotope has a half life of 30 seconds and emits beta particles with an energy of 3.55 MeV. These beta particles calibrate the film badges to indicate the amount of radiation associated with the particular degree of darkening of the film.

However, neither of the isotopes involved in the calibration source of Staples provides alpha particles. Furthermore, Staples does not have to contend with either of the isotopes existing in the gaseous state. Consequently, he does not help adjust an alpha-scintillation counter.

SUMMARY

A reference cell for an alpha-scintillation detector should first include a gas-tight container. At least part of the container should have a composition of a substantially transparent gas-impermeable section of material. The transparent material will allow the light produced by the scintillating alpha particles to escape to a photomultiplier tube.

To provide the light for the detector, the cell should include a luminescent material adhered to the inside of the container. The luminescent material, however, should not cover the portion of the container through which the light should pass to the light detector.

Lastly, the cell should include, on the inside of the container, a supply means for generating, eventually, alpha particles. These alpha particles then interact with the luminescent material to produce the light spectrum for adjusting the instrument.

The supply means may directly produce alpha particles and other substances which may also generate further alpha particles. With the right combination of half lives for the different involved radionuclides, the number of alpha particles can increase over an extended period of time. Thus, the reference cell, instead of directly dying out, can actually experience added vigor over several years.

Alternately, the supply means may exist in a nongaseous state inside of the container. To create a uniform distribution of alpha particles, the supply means may produce a gaseous radioactive substance which can diffuse throughout the cell. This daughter radionuclide can itself radioactively decay to produce alpha particles. Moreover, the parent nongaseous substance may have a half life at least twice as long as its gaseous daughters. The parent's greater half life will allow for the production of alpha particles from the daughter substance for a longer time than the latter itself can achieve.

For a cell simulating the light spectrum of scintillating radon$^{222}$, the supply means inside may, in particular, produce these particular radionuclides. Moreover, the supply means may itself produce alpha particles in addition to those generated by the radon$^{222}$ nuclides and daughters. These additional alpha particles directly generated by the supply means can increase the quantity of the light pulses provided by the reference cell.

As a further aspect, the supply means may take the form of radium$^{226}$ deposited in one particular location of the cell. It can then produce gaseous radon$^{222}$, which will distribute itself uniformly within the cell's interior. The radon$^{222}$ can then decay into its daughter nuclides which return to the solid state. The uniform distribution of the radon$^{222}$ within the container, however, will result in the daughter nuclides having a uniform distribution over the cell's interior. The alpha particles emitted by the daughter radionuclides then create a uniform distribution of light within the cell.

The supply means producing the radon$^{222}$ will decay with time. The reference cell containing it will display a particular desirability if the half life of the supply means at least equals five years.

If radium$^{226}$ represents the supply means, it and its daughter radionuclides will mostly produce alpha particles. Some of these alpha particles must, however, await the birth of their parent radionuclides. Consequently, the total concentration of alpha particles within the cell can actually increase with time after the construction of the reference cell. In particular, for radium$^{226}$, the concentration of alpha particles will grow for a period of 22 years. Furthermore, these alpha particles all fall within the energy range of about 4.5 to 7.7 MeV. This, of course, represents the typical energy spectrum of the alpha particles of radon$^{222}$ and its decendents.

Using radium$^{226}$ also displays a further advantage. It occurs naturally. Consequently, its utilization does not require licensing by the Nuclear Regulatory Commission.

The alpha particles emitted by radium$^{226}$ itself may beneficially aid the luminescent light amplitude spectrum. In such a case, the radium's location within the cell should permit these particles to strike the luminescent material.

Should, however, these alpha particles interfere with the resultant light spectrum, then the cell should interpose a barrier between the radium and the luminescent material. Typically, the barrier need only prevent alpha particles, travelling only in a straight line from the radium, from reaching the luminescent coating. The barrier may simply direct radium's alpha particles through the cell's window and, thus, not provide it with an opportunity to strike the phosphors. Alternatively, it may blockade these particles while allowing the gaseous radon to diffuse to a position where its alpha particles can produce light.

An improved, strengthened cell employs a container having a tube of metal with cylindrical symmetry and open ends. To provide the transparent window, a substantially transparent gas-impermeable first section of material rigidly adheres to one end of this tube in a gas-tight relationship. To complete the container, a gas-impermeable second section of material rigidly adheres to the other end of the tube, also in a gas-tight relationship.

Alternately, the container may take the form of any tube of metal having open ends. A substantially transparent gas-impermeable flat first section of material again adheres with a gas-tight bond to the tube adjacent to one of the open ends. Similarly, a gas-impermeable flat second section of material, substantially similar in area and shape to the first section of material, rigidly adheres to the tube adjacent to its other open end. Again, it has a gas-tight bond to the tube.

The flat surfaces of the first and second sections may then lie substantially parallel to each other. The two sections, however, should locate over each other. In other words, a line passing perpendicular to, and through the center of, the flat surface of the first section also passes through the center of the flat surface of the other section of material.

Fabricating a reference cell for radon$^{222}$ involves coating at least a part of a surface of a section of substantially rigid material with a luminescent compound. A container should undergo construction and include the section of material having the luminescent compound. The compound should, of course, have a location on the container's inside. The container should also have a second portion which displays substantial transparency to the passage of light. This allows the produced light to escape to the detector.

Charging the cell then involves placing radium$^{226}$ on the inside of the container. With the radium$^{226}$ on the inside, the container should then become closed to the ingress or egress of gaseous substances.

Conveniently, the radium$^{226}$ enters the container's inside while entrained in a liquid. The provides a convenient form in which to handle it. Afterwards, however, the liquid should undergo removal from the container. Evaporation represents a convenient method for accomplishing this.

DETAILED DESCRIPTION

Figure 1:
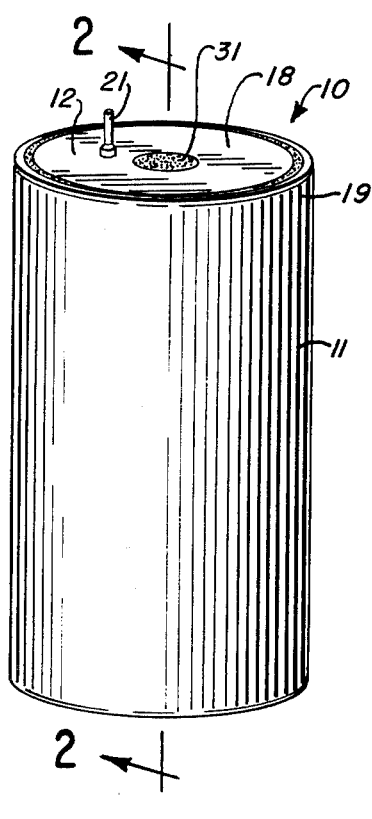
FIG. 1 gives a perspective view of a reference cell simulating the light spectrum of an alpha scintillation cell containing radon$^{222}$.

A reference cell simulating the light spectrum of scintillating alpha particles produced by radon$^{222}$ may assume the configuration of the container 10 in FIG. 1. In particular, the container 10 has the side 11 formed from a tube of metal, such as aluminum, and the top 12 formed from a disk of a similar material. Specific details of a cell very similar to that of FIG. 1, its component parts, and construction appears in the patent application of W. M. Stevens, "Strengthened Scintillation Cell", referenced above. The scintillation cell of that application, however, permits the ingress and egress of the different samples undergoing testing. Consequently, it includes a closable conduit in fluid communication with the cell's interior for this purpose. A stopcock allows the operator to open and close this conduit as needed.

Figure 2:
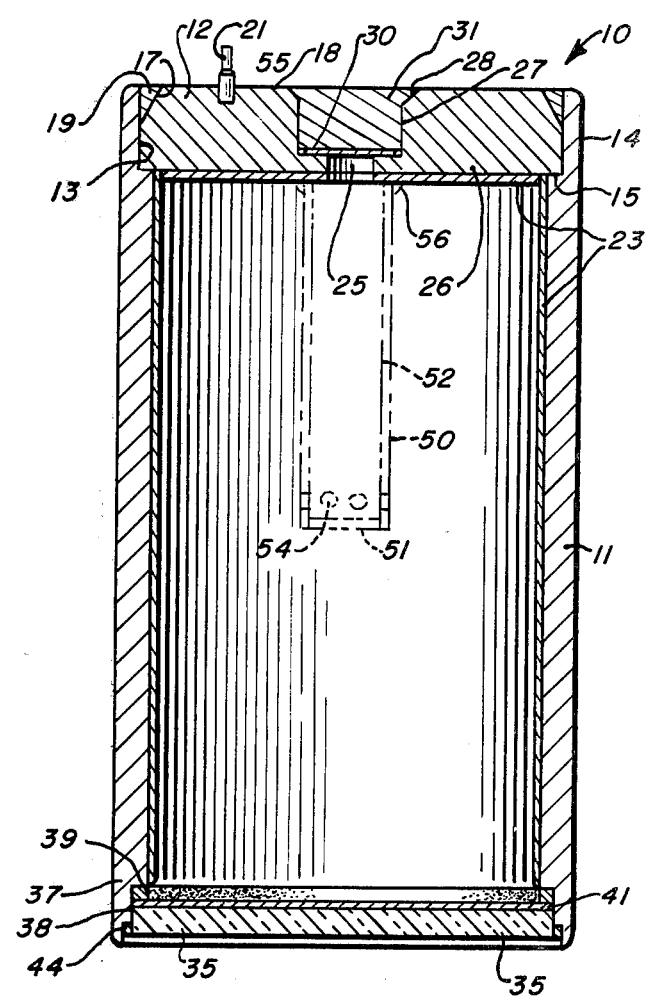
FIG. 2 provides a cross sectional view along the line 1—1 of the cell of FIG. 1.

In the cross sectional view of FIG. 2, the side 11 of the tubular container 10 has the circular ring 13 cut into its end 14. The flat top section 12 fits within the ring 13. The annular shoulder 15 limits the entrance of the top section 12 into the tube 11.

The top section 12 has the annular notch 17 cut into its upper surface 18. The space between the notch 17 and the end 14 of the tube 11 provides an annular groove to accomodate the adhesive bond 19, usually an epoxy. The adhesive 19 affixes the top 12 to the tubular side 11.

At least part of the epoxy 19 in the groove between the top 12 and the side 11 should have the ability of conducting electricity. This allows any electric charge which may accummulate on the side 11 to transfer to the cell's top 12. This charge results, of course, from the charged alpha particles contacting the side 11. The electric charge in the top 12 may then move to the post 21, conveniently formed of gold, which usually connects to ground.

The side 11 and the top 12, once adjoined to each other by the epoxy 19, then receive the coating of luminescent material 23. Generally, spraying the luminescent material results in an even coating on the side 11 and the top 12. Heating and spinning the cell 10 during this time allows for the production of an acceptably thick layer of coating 23 with the application of a relatively few and thick coats over a shorter period of time. The thickness of the coating 23 should result in its determining the characteristics of the interior surface of the cell 10, and not the aluminum or other substance forming the side 11 and the top 12. For the alpha particles of radium$^{226}$, radon$^{222}$, and their daughters, zinc sulfide represents a suitable luminescent material 23.

The top section 18, in its middle, has the small circular opening 25 at its bottom 26. This opening adjoins to the larger circular opening 27 which passes to the cell's upper surface 18. The larger opening 27 has the flaring 28 near where it meets the surface 18.

In W. M. Stevens' patent application mentioned above, the openings 25 and 27 and the flaring 28 allow for the insertion and affixation of a stopcock's stem. The stopcock permits the introduction and withdrawal of different samples.

The reference cell 10, typically, however, need not accommodate different materials inside of it. In fact, with radium$^{226}$, the cell 10 would possess an effective half life of over 1600 years. Consequently, the cell 10, when charged with radium$^{226}$, may undergo a permanent and total sealing against the ingress or egress of any gaseous substance.

Nonetheless, the smaller and larger openings 25 and 27 permit the facile closing of the cell 10. With the radium$^{226}$ inside, as discussed below, a small piece of tape, such as the cellophane type, enters through the large opening 77 to cover the smaller opening 25. An epoxy 31 may simply fill the space of the larger opening 27 as well as the flared region 28. The epoxy effectively prevents the passage of gaseous substances into or out of the cell 10. The tape 30 serves the purpose of keeping the epoxy 31, before it cures, from entering the cell's interior 10.

Figure 3:
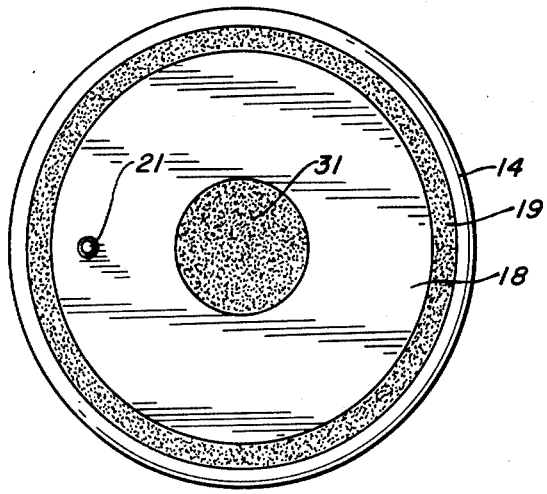
FIG. 3 gives a top plan view of the cell of FIG. 1.

FIG. 3 shows the various components that actually constitute the upper surface of the reference cell 10. As a last step, the components shown in that figure receive a coat of paint in order to give it a pleasing appearance.

Figure 4:
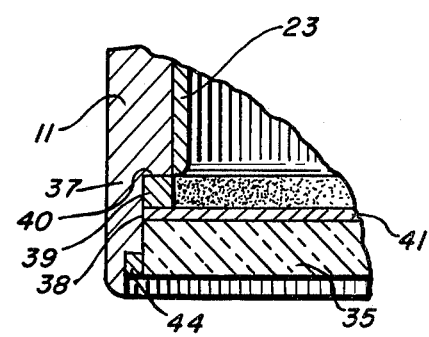
FIG. 4 gives an enlargement of the lower left-hand corner of the cross sectional view of the cell shown in FIG. 2.

As shown in FIG. 2, and more clearly in FIG. 4, the section of transparent material 35 sits at the other end of the tube 11 to completely seal in the cell's contents. However, it allows for the light produced by the scintillating alpha particles to pass out of the cell 10 and to the light detector, or multiplier tube. Glass and especially quartz constituted desirable substances for the transparent material 35.

To accommodate the quartz section 35, the lower end 37 of the tubular side 11 has the groove 38 cut into it. The quartz section 35 fits into the groove 38. The conductive epoxy 39 retains the quartz 35, in the groove 38, against the shoulder 40. It also provides an electrical path between the metallic side 11 and the coating of stannous oxide 41 on the inside surface of the quartz 35. Charged particles reaching the quartz section 35 could deposit a layer of electric charge upon it. The stannous oxide layer 41 conducts this electricity to the conducting epoxy 39 which transfers it to the cell's side 11. As discussed above, it can then move to the top section 12 and bleed off through the grounding post 21.

The lower end 37 of the tubular side 11 has the wider groove 43 located near its edge. The epoxy 44 fills the space between the quartz section 35 and the groove 43 and helps hold the former to the cell's side 11. Because of the electric path established by the conducting epoxy 39, the later-applied epoxy 44 need not transport electric current.

As stated above, the side 11 typically has a metallic or even aluminum composition, and the transparent section 35 preferably takes the form of quartz. These two substances have substantially different coefficients of thermal expansion. Consequently, the conducting epoxy 39 and the nonconducting epoxy 44 should display sufficient pliability to allow for relative movement between these two components as the cell 10 undergoes changes in its ambient temperature.

When the quartz section 35 properly sits against the shoulder 40, the lower edge 47 of the tube side 11 extends beyond the quartz 35. This allows the operator to place the cell 10, in the orientation shown in the figures, upon a flat surface. In this position, the quartz 35 lies very close to the surface upon which the cell 10 sits. However, the edge 47 prevents contact and the subsequent scratching of the quartz 35 by the surface upon which the cell 10 sits.

With the quartz 35 adhered to the tube's side 11, the cell 10 can then receive its charge of the radioactive material supplying the alpha particles. As discussed above, this generally takes the form of radium$^{226}$. The introduction of the radium would occur, naturally, before the sealing of the large opening 27 in the cell's top section 12 by the epoxy 31. Conveniently, the radium can enter the interior of the cell 10 while entrained in a liquid. After its introduction, the liquid may be removed through, for example, evaporation. The sealing of the opening 27 would then follow.

Placing the radium inside the cell 10 normally allows the alpha particles emitted by the radium itself to strike the luminescent material 23. The luminescent material 23 would then produce light which, consequently, results partially from alpha particles not produced by radon$^{222}$ or its daughters. Such light normally adds to the utility of the cell 10; it increases the intensity of the resulting light spectrum.

However, the alpha particles emitted by the radium could, however, create undesired aberations in the spectrum normally associated with the scintillation of radon$^{222}$ and its daughter radionuclides. Thus, preventing any scintillation from the alpha particles of radium$^{226}$ could become important. The tube 50, shown in phantom in FIG. 2, effectively prevents such alpha particles from reaching the luminescent material 23 and producing light. In one form, the tube may simply have an open end 51 with the solid side 52. The radium placed inside would sit close to the opening 25 in the top section 12. The elongated tube 50 would columnate the alpha particles emitted by the radium. As a result, the particles could only travel directly to the quartz section 35 and out of the cell 10. They would not have an opportunity to travel in a straight line from the radium to the luminescent material 23. Not striking the phospher 23, they could not produce light.

Nonetheless, the gaseous radon daughters of the radium placed in the tube 52 would diffuse through the open bottom 51 of the tube 50. They would then uniformly disperse throughout the interior of the cell 10. The alpha particles produced from such radon atoms could then travel directly to the luminescent material 23. Striking it, they would produce the light needed to standardize the instrument.

Alternately, the tube 50 could have the end 51 closed. However, it could also include the small openings 54 passing through the side 52 near the end 51. The radium, existing in the solid state, would remain where placed near the end of the tube 50 closest to the cell's top 12. Its alpha particles, travelling in a substantially straight line, would only strike the end 51 of the tube 50. With no luminescent material located there, they could not scintillate to produce light. However the gaseous radon$^{222}$ daughter atoms would diffuse, eventually, through the openings 52, and into the interior of the cell 10. Its alpha particles could then travel in a direct line to the luminescent material 23, scintillate, and produce light. The daughter radionuclides of radon then become solid components and deposit along the walls of the cell 10. Their alpha particles would also react with the luminescent material 23 to produce light.

Radon$^{222}$ itself has a half life of approximately 3.825 days. A cell, with only radon$^{222}$, could display only a very short useful life. Employing radium$^{226}$ greatly extends the life time of such a reference cell. In fact, it extends it to such an extent that the cell may be permanently sealed. This results since radium$^{226}$ has a half life of 1620 years.

Introducing radium$^{226}$ into the cell 10 begins a series of reactions many of which produce alpha particles. The radium decays to radon$^{222}$ through the production of this type of particle. Radon$^{222}$, by emitting an alpha particle, produces polonium$^{218}$. Almost all of the polonium$^{218}$ will emit an alpha particle to become lead$^{214}$. This moiety yields two beta particles to become polonium$^{214}$, which gives up a further alpha particle to become lead$^{210}$. This substance, after the production two further beta particles, becomes polonium$^{210}$, which produces one more alpha particle to become the stable lead$^{206}$. The half lives of these reactions varies considerably from 1620 years for radium$^{226}$ to $1.6 \times 10^{-4}$ seconds for polonium$^{214}$. Lead$^{210}$, however, requires 21 years to produce its decay products.

As a consequence of these reactions, the first alpha particles within the cell derive from the radioactive decay of radium. Shortly afterwards, the alpha particles from radon$^{222}$ joins those which the radium$^{226}$ continues to produce. The decay products from polomium$^{218}$, which also includes an alpha particle, subsequently add to those of the radium$^{226}$ and the radon$^{222}$. Thus, for a significant period of time after the original construction of the cell, the concentration of alpha particles inside actually increases. This will continue to occur until the components within the cell reach a state of dynamic equilibrium. This takes approximately 22 years, due primarily to the 21-year half life of lead$^{210}$. Afterwards, as the amount of the supply radium$^{226}$ continues to shrink because of its decay, the alpha particle concentration within the cell can then start to decline. Thus, the cell, once manufactured, does not undergo an immediate reduction in the alpha-particle scintillation. On the contrary, it actually shows an increase in this activity. Furthermore, the increase in scintillation continues for an extended period of time. Even when the reduction commences after 22 years, the cell has an extremely long life time afterwards since the radium$^{222}$ has the stated half life of 1620 years.

The production of the reference cell 10 shown in the figures proceeds very similarly to the fabrication of the sample cell in W. M. Stevens' patent application "Strengthened Scintillation Cell", mentioned above. Specifically, the tube 11 and the top section 12 undergo degreasing with 1,1,1-trichlorolethane vapor. After placing the end section 12 adjacent to the shoulder 15, three drops of a conductive epoxy formed from ten parts by weight of AG-1 resin with one part AG-1 hardner and three parts #410 thinner (all sold by Thermoset, Inc., Indianapolis, Indiana) are placed approximately 120° apart from each other between the notch 17 and the edge 13. This epoxy establishes electrical contact between the components. A nonconducting epoxy formed from six parts of DC-590 resin with one part H-8 hardner (also sold by Thermoset, Inc.) then fills the remaining space between the pieces. Twelve hours generally provides sufficient time for the epoxy 19 to cure.

After curing, the hole 55 for the grounding post 21 is drilled into the top section 12. The interior of the container 10, but without the quartz 35, and the openings 25 and 27 undergo sandlbasting to prepare for further processing.

The sandblasted cell then receives a further degreasing with 1,1,1-trichlorolethane vapor. The degreased cells then enter a recirculating-air oven where they remain until they reach a temperature of approximately 80° C. From the oven, the cell goes to a rotating table where it receives a multitude of coats of luminescent paint applied with an air brush and containing the following ingredients:
(1) 50.0 grams of a zinc sulfide phosphor sold as pigment #2205 by the United States Radium Corporation of Hackettstown, N.J;
(2) 200 ml. of acetone;
(3) 100 ml. of amyl acetate; and
(4) 15 ml. of butylrate dope.
The spraying utilizes about 5 ml. of the mixture.

The cell returns to the oven and again reaches a temperature of about 80° centigrade. Further coats of the mixture are then applied until the cell carries two grams or more of the luminescent material. The cell then returns to the oven for an hour to complete the drying of the luminescent material. At this point, the cell should undergo examination to ascertain that it has a regular coating of the luminescent material on its inside.

The cell is then placed in a shop lathe. With the lathe rotating at minimum speed, the luminescent material from the window seating lip 38, 40, and 43 is removed from the tube 11. An airhose held about two feet from the cell removes any remaining loose luminescent material. A cloth dampened with 1,1,1-trichlorolethane effects the final cleaning of the window mounting lip as well as the openings 25 and 27. One drop of the conduvtive epoxy described above attaches the grounding post 21 to the top section 12 at this time.

A thin bead of the above conductive epoxy is placed on the bottom of the cell on the should 40 around the entire cell. A section of quartz 35, with the conducting surface 41 oriented towards the interior of the cell and previously cleaned with a lint-free cloth, is seated against the should 40. The cell is then placed in the oven with the window portion pointing upwards for two hours at a temperature of 80° C.

The cell then receives a small amount of water containing radium$^{226}$. Specifically, about 0.5 ml. generally having sufficient radium$^{226}$ to provide around 1500 to 2500 counts per minute passes into the cell through the openings 25 and 27. The entire cell then enters a oven having a temperature of about 70° to 80° C. and remains there until dry. This normally takes about one hour. During this time, the water evaporates and deposits the radium on the cell's surface.

To remove any water vapor, the cell enters a vaccum chamber which then undergoes flushing with air. This process normally involves evacuating the chamber two to four times under the action of a vaccum pump and subsequently allowing fresh air to enter. The repetition of this process should continue until any visual appearance of moisture has disappeared.

The flushing process, incidentally, also removes any radon gas which may have formed since the introduction of the radium$^{226}$. While this does not represent a required facet of the operation, it does provide a starting time for the birth of the cell and the generation of its alpha=particle concentration.

At this point, the cell has progressed sufficiently to permit its permanently sealing. To achieve, this, a piece of cellophane tape 30 covers the smaller opening 25 to prevent epoxy from entering the interior of the cell 10. The epoxy 31 then enters the larger opening 27 until it extends up to the upper surface 18 of the top section 12. After the epoxy cures, the entire top 18 of the cell 10 undergoes machining and painting to acquire a pleasing appearance.

To include the tube 50 within the cell 10 requires its adherence with a weld or the epoxy 56 prior to placing the luminescent coating 23 on the inside of the cell 10. The radium should sit inside of the tube 50 near the top section 12. The radium, entrained in a liquid, could enter the tube 50 through the opening 25 and 27 at about the same time that it did in the process described above for the cell which did not utilize the tube 50. After receiving the radium inside the tube 50, the cell 10 would undergo the same, baking, flushing, sealing, and finishing steps described above.

Alternately, the tube 50 could contain the radium in a dry state at the time of its attachment to the top section 12. This would allow the tube 50, with the radium inside, to have previously undergone the baking and flushing steps described above. This would obviate the necessity for the entire cell 10 to undergo the same steps since their purpose would have already been accomplished by the prior treatment of the tube 50 above.

Accordingly, what is claimed is:

1. A reference cell simulating the light spectrum of an alpha scintillation cell containing radon$^{222}$ for the purpose of calibrating electronic equipment detecting scintillations resulting from the radioactive decay of radon$^{222}$, said cell comprising:
   (A) a normally closed gas-tight container formed at least partially from a substantially transparent gas-impermeable section of material;
   (B) a luminescent material adhered to the inside of a first portion of said container, said luminescent material not adhering to the inside of a second portion of said container, said second portion including at least a part of said transparent section of material; and
   (C) supply means within said container for generating
      (i) radon$^{222}$; and
      (ii) alpha particles, in an amount of less than about 2500 such particles per minute, in addition to those generated by said radon$^{222}$ and its decay products.

2. The cell of claim 1 wherein said luminescent material is coated on the inside of said first portion of said container.

3. The cell of claim 2 wherein said supply means has a half life of at least five years.

4. The cell of claim 3 wherein the total number, within said container, of (i) alpha particles generated by said supply means and (ii) alpha particles produced by said radon$^{222}$ and its decay products increases with time.

5. The cell of claim 4 wherein the total number of alpha particles within said container, (i) generated by said supply means and including those produced by said radon$^{222}$ and its decay products and (ii) falling within the range of about 4.5 to 7.7 MeV., increases with time.

6. The cell of claim 5 wherein said container is totally and permanently sealed against the ingress or egress of gaseous substances.

7. The cell of claim 5 wherein said supply means is placed within said container in a position from where said alpha particles, produced in addition to those generated by said radon$^{222}$ and its decay products and travelling in a substantially straight line, can travel from said supply means to said luminescent material.

8. The cell of claim 7 wherein any radioactive substance within said container is naturally occurring.

9. The cell of claim 5 further including shield means, coupled to said container and located between said supply means and said luminescent material, for preventing alpha particles produced by said supply means, in addition to those alpha particles generated by said radon$^{222}$ and its decay products, from travelling in a substantially straight line from said supply means to said luminescent material.

10. The cell of claim 9 wherein said shield means includes a cylindrically symmetric tube open at one end and fitting inside of said container with said open end being smaller than and oriented towards said substantially transparent section of material.

11. The cell of claim 10 wherein any radioactive substance within said container is naturally occurring.

12. The cell of claim 9 wherein said shield means includes an elongated tube coupled to said container, closed at both ends, and having said supply means located at one end of said tube and openings passing through the side of said tube near the other end.

13. The cell of claim 12 wherein any radioactive substance within said cell is naturally occurring.

14. The cell of claim 5 wherein said supply means includes radium$^{226}$.

15. The cell of claim 5 wherein said container includes:
(A) a tube of metal having open ends;
(B) a substantially transparent, gas-impermeable flat first section of material adhered with a gas-tight bond to said tube adjacent one of said open ends; and
(C) a gas-impermeable flat second section of material, substantially similar in area and shape to said first section of material, rigidly adhered with a gas-tight bond to said tube adjacent to the other of said open ends, the flat surfaces of said first and second sections lying substantially parallel to each other and said second section being located such that a line passing perpendicular to and through the center of the flat surface of said first section of material passes through the center of the flat surface of said second section of material.

16. The cell of claim 5 wherein said container includes:
(A) a tube of metal having cylindrical symmetry and open ends;
(B) a substantially transparent gas-impermeable first section of material rigidly adhered to one end of said tube in a gas-tight relationship; and
(C) a gas-impermeable second section of material rigidly adhered to the other end of said tube in a gas-tight relationship.

17. A reference cell simulating the light spectrum of an alpha scintillation cell, said cell comprising:

(A) a normally closed gas-tight container formed at least partially from a substantially transparent gas-impermeable section of material, said container including:
(1) a tube of metal having cylindrical symmetry and open ends;
(2) a substantially transparent gas-impermeable first section of material rigidly adhered to one end of said tube in a gas-tight relationship; and
(3) a gas-impermeable second section of material rigidly adhered to the other end of said tube in a gas-tight relationship;
(B) a luminescent material coating the inside of a first portion of said container, said luminescent material not coating the inside of a second portion of said container, said second portion including at least a part of said transparent section of material; and
(C) radioactive nongaseous supply means, within said container and having a first half life, for generating, by radioactive decay, a gaseous radioactive material having a second half life and undergoing radioactive decay to produce alpha particles, said first half life being at least twice as long as said second half life.

18. The cell of claim 17 wherein said supply means has a first half life of at least five years.

19. The cell of claim 18 wherein the total number of alpha particles within said container produced by said supply means, said radioactive material, and the decay products of either increases with time.

20. The cell of claim 19 wherein the total number of alpha particles (i) generated by said supply means and including those produced by said radon$^{222}$ and (ii) falling within the range of about 4.5 to 7.7 MeV. increases with time.

21. The cell of claim 20 wherein said container is totally and permanently sealed against the ingress or egress or gaseous substances.

22. The cell of claim 21 wherein said supply means is placed within said container in a position from where said alpha particles, produced in addition to those generated by said radon$^{222}$ and its decay products and travelling in a substantially straight line, can travel from said supply means to said luminescent material.

23. The cell of claim 22 wherein any radioactive substance within said container is naturally occurring.

24. The cell of claim 21 further including shield means, coupled to said container and located between said supply means and said luminescent material, for preventing alpha particles produced by said supply means, in addition to those alpha particles generated by said radon$^{222}$ and its decay products, from travelling in a substantially straight line from said supply means to said luminescent material.

25. The cell of claim 24 wherein any radioactive substance within said container is naturally occurring.

26. The cell of claim 25 wherein said shield means includes a cylindrically symmetric tube open at one end and fitting inside of said container with said open end being smaller than and oriented towards said substantially transparent section of material.

27. The cell of claim 25 wherein said shield means includes an elongated tube coupled to said container, closed at both ends, and having said supply means located at one end of said tube and openings passing through the side of said tube near the other end.

28. The cell of claim 21 wherein said first half life is at least 1000 times greater than said second half life.

29. The cell of claim 28 wherein said container includes:
 (A) a tube of metal having open ends;
 (B) a substantially transparent, gas-impermeable flat first section of material adhered with a gas-tight bond to said tube adjacent to one of said open ends; and
 (C) a gas-impermeable flat second section of material, substantially similar in area and shape to said first section of material, rigidly adhered with a gas-tight bond to said tube adjacent to the other of said open ends, the flat surfaces of said first and second surfaces lying substantially parallel to each other and said second section being located such that a line passing perpendicular to and through the center of the flat surface of said first section of material passes through the center of the flat surface of said second section of material.

30. The cell of claim 28 wherein said supply means includes radium$^{226}$.

31. A reference cell simulating the light spectrum of an alpha scintillation cell containing radon$^{222}$ for the purpose of calibrating electronic equipment detecting scintillations resulting from the radioactive decay of radon$^{222}$, said cell comprising:
 (A) a normally closed gas-tight container formed at least partially from a substantially transparent gas-impermeable section of material;
 (B) a luminescent material coating the inside of a first portion of said container, said luminescent material not coating the inside of a second portion of said container, said second portion including at least a part of said transparent section of material; and
 (C) radioactive material producing alpha particles, located within said container and including:
   (i) nongaseous radium$^{226}$;
   (ii) gaseous radon$^{222}$ distributed substantially uniformily within the interior of said container; and
   (iii) nongaseous decay products of radon$^{222}$, said decay products being radioactive and distributed substantially uniformily over the inside of said first portion of said container.

32. The cell of claim 31 wherein the number of alpha particles within said cell produced by said radioactive materials increases with time.

33. The cell of claim 32 wherein said container is totally and permanently sealed against the ingress or egress of gaseous substances.

34. The cell of claim 33 wherein said supply means is placed within said container in a position from where said alpha particles, produced in addition to those generated by said radon$^{222}$ and its decay products and travelling in a substantially straight line, can travel from said supply means to said luminescent material.

35. The cell of claim 33 wherein further including shield means, coupled to said container and located between said supply means and said luminescent material, for preventing alpha particles produced by said supply means, in addition to those alpha particles generated by said radon$^{222}$ and its decay products, from travelling in a substantially straight line from said supply means to said luminescent material.

36. The cell of claim 35 wherein said shield means includes a cylindrically symmetric tube open at one end and fitting inside of said container with said open end being smaller than and oriented towards said substantially transparent section of material.

37. The cell of claim 35 wherein said shield means includes an elongated tube coupled to said container, closed at both ends, and having said supply means located at one end of said tube and openings passing through the side of said tube near the other end.

38. The cell of claim 35 wherein said container includes:
 (A) a tube of metal having open ends;
 (B) a substantially transparent, gas-impermeable flat first section of material adhered with a gas-tight bond to said tube adjacent one of said open ends; and
 (C) a gas-impermeable flat second section of material, substantially similar in area and shape to said first section of material, rigidly adhered with a gas-tight bond to said tube adjacent to the other of said open ends, the flat surfaces of said first and second sections lying substantially parallel to each other and said second section being located such that a line passing perpendicular to and through the center of the flat surface of said first section of material passes through the center of the flat surface of said second section of material.

39. The cell of claim 35 wherein said container includes:
 (A) a tube of metal having cylindrical symmetry and open ends;
 (B) a substantially transparent gas-impermeable first section of material rigidly adhered to one end of said tube in a gas-tight relationship; and
 (C) a gas-impermeable second section of material rigidly adhered to the other end of said tube in a gas-tight relationship.

40. A reference cell simulating the light spectrum of an alpha scintillation cell, said cell comprising:
 (A) a normally closed gas-tight container formed at least partially from a substantially transparent gas-impermeable section of material, said container including:
   (1) a tube of metal having open ends;
   (2) a substantially transparent, gas-impermeable flat first section of material adhered with a gas-tight bond to said tube adjacent one of said open ends; and
   (3) a gas-impermeable flat second section of material, substantially similar in area and shape to said first section of material, rigidly adhered with a gas-tight bond to said tube adjacent to the other of said open ends, the flat surfaces of said first and second sections lying substantially parallel to each other and said second section being located such that a line passing perpendicular to and through the center of the flat surface of said first section of material passes through the center of the flat surface of said second section of material;
 (B) a luminescent material adhered to the inside of a first portion of said container, said luminescent material not adhering to the inside of a second portion of said container, said second portion including at least a part of said transparent section of material; and
 (C) radioactive supply means within said container for generating alpha particles, the number of alpha particles being generated by said supply means increasing with time.

41. The cell of claim 40 wherein said supply means has a half life of at least five years.

42. The cell of claim 41 wherein said luminescent material is coated on the inside of said first portion of said container.

43. The cell of claim 42 wherein the total number of alpha particles within said containers, (i) generated by said supply means and including those produced by said radon$^{222}$ and its decay products and (ii) falling within the range of about 4.5 to 7.7 MeV., increases with time.

44. The cell of claim 43 wherein said container is totally and permanently sealed against the ingress or egress of gaseous substances.

45. The cell of claim 44 wherein any radioactive substance within said container is naturally occurring.

46. The cell of claim 45 wherein said supply means is placed within said container in a position from where said alpha particles, produced in addition to those generated by said radon$^{222}$ and its decay products and travelling in a substantially straight line, can travel from said supply means to said luminescent material.

47. The cell of claim 45 further including shield means, coupled to said container and located between said supply means and said luminescent material, for preventing alpha particles produced by said supply means, in addition to those alpha particles generated by said radon$^{222}$ and its decay products, from travelling in a substantially straight line from said supply means to said luminescent material.

48. The cell of claim 47 wherein said shield means includes a cylindrically symmetric tube open at one end and fitting inside of said container with said open end being smaller than and oriented towards said substantially transparent section of material.

49. The cell of claim 47 wherein said shield means includes an elongated tube coupled to said container, closed at both ends, and having said supply means located at one end of said tube and openings passing through the side of said tube near the other end.

50. The cell of claim 45 wherein said supply means includes radium$^{226}$.

51. The cell of claim 50 wherein said container includes:
(A) a tube of metal having cylindrical symmetry and open ends;
(B) a substantially transparent gas-impermeable first section of material rigidly adhered to one end of said tube in a gas-tight relationship; and
(C) a gas-impermeable second section of material rigidly adhered to the other end of said tube in a gas-tight relationship.

* * * * *